United States Patent [19]

Burtis

[11] 4,056,746
[45] Nov. 1, 1977

[54] COUNTERROTATION ELECTRIC MOTOR

[76] Inventor: Wilson A. Burtis, 5011 Harvard Ave., Westminster, Calif. 92683

[21] Appl. No.: 623,717

[22] Filed: Oct. 20, 1975

Related U.S. Application Data

[60] Continuation-in-part of Ser. No. 534,854, Dec. 20, 1974, abandoned, which is a division of Ser. No. 293,652, Sept. 29, 1972, abandoned.

[51] Int. Cl.$^2$ ............................................. H02K 23/60
[52] U.S. Cl. .................................... 310/115; 310/118; 310/148
[58] Field of Search ..................... 310/115, 118, 148; 320/14, 61; 322/100

[56] References Cited

U.S. PATENT DOCUMENTS

| | | | |
|---|---|---|---|
| 2,256,035 | 9/1941 | Potter | 310/118 |
| 2,564,741 | 8/1951 | Vermillion | 310/118 |
| 3,611,091 | 10/1971 | Genovese | 320/14 X |

*Primary Examiner*—Robert J. Hickey

[57] ABSTRACT

An electric motor including a rotary armature and an annular field mounted for rotation around said armature and geared to said armature by way of planetary gearing fixed to the housing whereby the opposing torques of the field and the armature are summed at the motor output shaft. Such counter-rotating field arrangement provides for an increase in the flux cutting speed of the motor while, at the same time, maintaining the angular rate of the armature at a speed which is compatible with the containment of the centrifugal forces thereof. Both the armature and the field include concentric commutation rings at one end of the motor such that the field coils and the armature coils are excited at a predetermined phase angle by a plurality of field and armature brushes. Disposed along the field and armature brushes, and separated therefrom by at least one commutation segment are corresponding pick-up brushes which receive the collapsing field transient of the individual coils in both the armature and the field. These pick-up brushes are, in turn, connected to an amplifying device thereby restoring some of the energy losses back to the power source for the motor.

8 Claims, 6 Drawing Figures

COUNTERROTATION ELECTRIC MOTOR

CROSS-REFERENCE TO RELATED APPLICATION

This application is a continuation-in-part of United States patent application Ser. No. 534,854 filed Dec. 20, 1974 entitled "Electric Engine Assembly, Including Pulsed High Voltage Surface Generator, Electric Motor, Electrical Conductor and Firing Tube," now abandoned, which, in turn, is a divisional of U.S. Ser. No. 293,652, filed on Sept. 29, 1972 entitled "Electric Engine With Pulsed High Voltage Surface Generator, Electric Motor, Electrical Conductor and Firing Tube", now abandoned.

BACKGROUND OF THE INVENTION

1. Field of the Invention

The present invention relates to electric motors, and particularly to electric motors having the armature and the field arranged for counter-rotation to apply total generated force to dynamic use.

2. Description of the Prior Art

Improvements in the power efficiency and torque output of electric motors have been the subject of extensive research in the art. Typically, however, such improvements were always directed at parameters which achieve optima only in certain local conditions such as the optimazation of stall torque or the optimazation of the running torque. One parameter which is consistently increasing in the direction of power increase is the relative core piece parameter where the increase in the flux cutting speed of the armature relative the field consistently results in an increase in the power output of the motor. Heretofor such cutting speed was controlled by the armature rotational rate which, in turn, was limited by the structural limits of the armature core piece and the retention of the coils. The field itself was normally stationary, often in fact being referred to as the stator, and therefore did not contribute in any way to this parameter.

A further phenomenon in the motor, and particularly in brushed commutated motors, which heretofor has been considered as a system loss, is the phenomenon of the collapsing field which results from the sequential opening of the commutation contact. This field transient, both in the coils of the armature and in the coils of the field itself, was heretofor dissipated in the adjacent field, very often in cancellation with the input transient to such adjacent coils.

A further feature heretofor not considered and particular to flywheel systems is the feature of storage of angular momentum. Again, most, or in fact, all prior art electric motors tie the rotating armature either directly or through gears to the energy storage flywheel, the stator or the field itself providing no angular momentum storage function. The net result is that firstly only part of the motor inertia is used to store the angular momentum and secondly, no cancellation of gyroscopic effects is possible in the prior art systems. Generally, however, the field windings in the stator entail relatively large current flows and therefore entail relatively large wire filaments distributed throughout the stator. This large mass is conveniently arranged in an annular arrangement around the axis of rotation of the motor itself and has not been previously utilized to advantage.

SUMMARY OF THE INVENTION

Accordingly, it is the general purpose and object of the present invention to arrange the stator of an electric motor for rotation, providing planetary gearing between the rotating armature and the now rotating field whereby counter-rotation of the field is achieved.

Further objects of the invention are to provide an electric motor including phase-lag pick-up commutating brushes adapted to connect selected coils of the motor, while such coils are undergoing the field collapse.

Yet further objects of the invention are to provide an electric motor where both the field and the armature are adapted to store angular momentum.

Additional objects of the invention are to provide an electric motor which is easy to produce, convenient in use, and requires few parts.

Briefly these and other objects are accomplished within the present invention by supporting an annular field in rotation about the shaft of the rotating armature. Formed along one edge of the annular field is an internally directed ring gear which is opposed to a pinion gear mounted on the shaft of the armature. Disposed between the pinion and the ring gear are a plurality of planetary gears, each planetary gear being secured for rotation to the housing of the motor. On the other end, both the field and the armature include commutating rings, the field commutating ring being directed inwardly while the armature commutating ring is directed outwardly. A plurality of field and armature brushes are disposed within the annular gap between the field and armature commutation rings for applying electrical power to the selected windings thereof. Both the field and the armature brushes are mounted on a manually adjustable governor assembly such that the phase relationship therebetween can be preset by way of the angular rotation thereof. Mounted on the same governor fixture are a plurality of pick-up brushes similarly directed both against the field commutation ring and against the armature commutation ring, the pick-up brushes being displaced to lag the input brushes by more than one commutation gap. In this manner, as the power to either the field coils or the armature coils is interrupted through the rotating shift of the respective input brushes, the resulting collapsing field transient in both coils is available. This collapsing field transient is applied to a power amplifier which through a rectifier returns the collapsing field energy in to the main power system to the motor.

DESCRIPTION OF THE SPECIFIC EMBODIMENT

While particular reference is made herein to a counter-rotating electric motor arrangement, such is for purposes of illustration only. It is to be understood that various other implementations of the basic concept are possible and no intent to limit the scope of the invention is expressed by the selection of the example herein.

Figure 1:
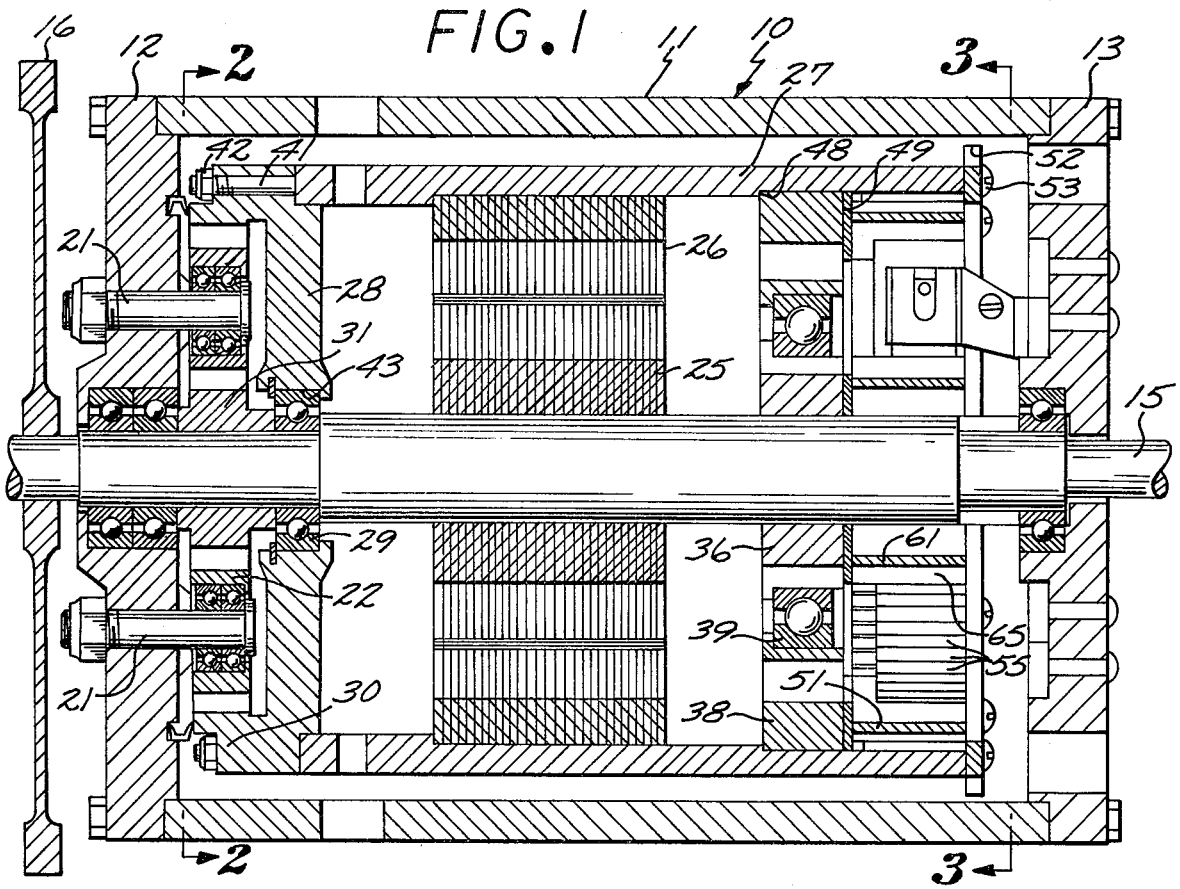
FIG. 1 is a side view in section of an inventive electric motor constructed according to the present invention.
Figure 2:
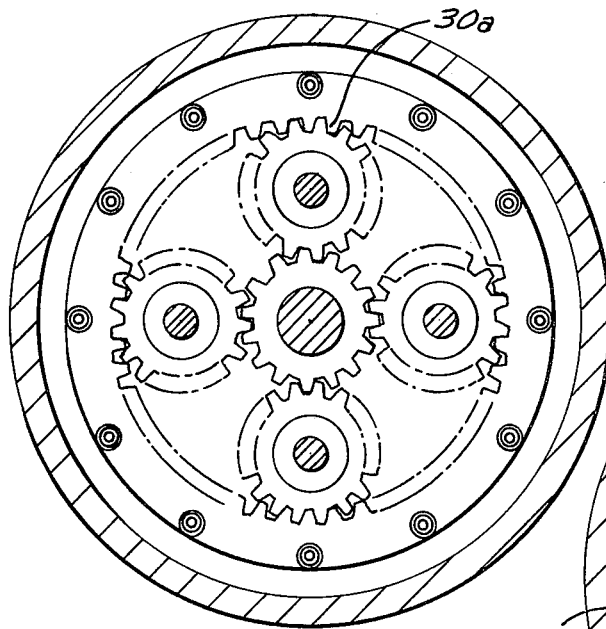
FIG. 2 is a sectional view taken along plane 2—2 of FIG. 1.

As shown in FIG. 1 an electric motor, generally designated by the numeral 10, comprises a cylindrical housing 11 including two circular end plates 12 and 13 supporting, in rotation, a central shaft 15. End plate 12 furthermore includes a plurality of planetary gear mounting bolts 21 directed into the interior of housing 11 and disposed along a ring around the central axis of shaft 15, to support in rotation a plurality of planetary gears 22. Formed on the central shaft 15, is a wound rotor or armature assembly 25 which is thus rotatable with the rotations of the shaft.

Arranged around armature 25 is an annular field 26 also wound, the field windings being secured at the periphery thereof within a cylindrical field shell 27 which, in turn, is supported for rotation about shaft 15.

More specifically, shell 27 comprises the section of a tube supported at one end on a bearing plate 28 which, across a bearing 29, centers the shell 27 with respect to the shaft 15. Formed along the exterior peripheral surface of bearing plate 28 is a flange or ring gear 30 including a plurality of inwardly directed teeth 30(a) which, in turn, engage the teeth of the planetary gears 22. Planetary gears 22 furthermore are in constant mesh with a central gear 31 mounted on shaft 15 distal of bearing 29. In this manner a counter-rotating gear arrangement is achieved between the armature 25 and the field 26.

The other end of field shell 27 is similarly supported in rotation on shaft 15 by a bearing 39 seated in a bearing plate 38 and engaging an opposing flange 36 formed on the shaft.

To facilitate assembly bearing plate 28 includes, around the periphery thereof, a plurality of bores 41, each receiving a bolt 42 which, in turn, threadably engages the adjacent edge of the shell 27.

The seating arrangement of bearing 29 in the bearing plate 28 is achieved by a bearing seat 43 conformed to receive the exterior race of the bearing 29 which is opposed by a retainer ring 44 on the other side of the bearing. At the other end, the bearing plate 38 is seated against a circular shoulder 48 formed on the interior of shell 27 and is secured thereat by an insulating washer 49 opposing a spacer ring 51.

Figure 3:
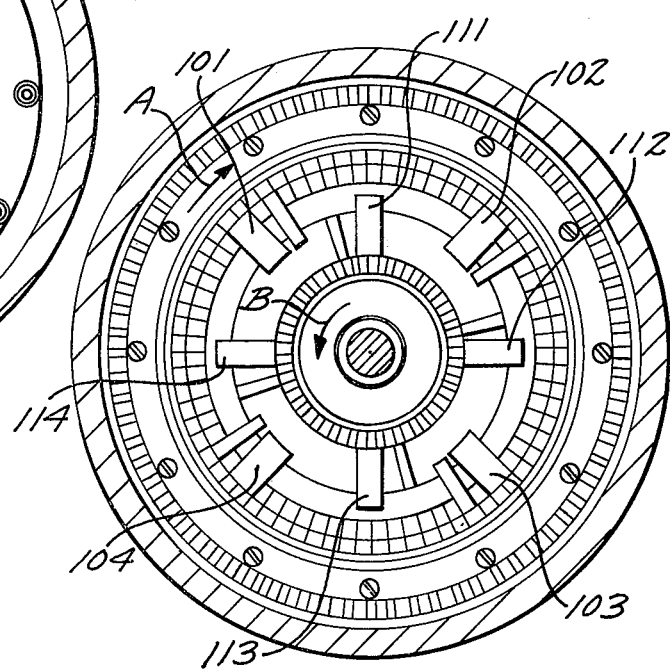
FIG. 3 is yet another sectional view taken along plane 3—3 of FIG. 1.
Figure 4:
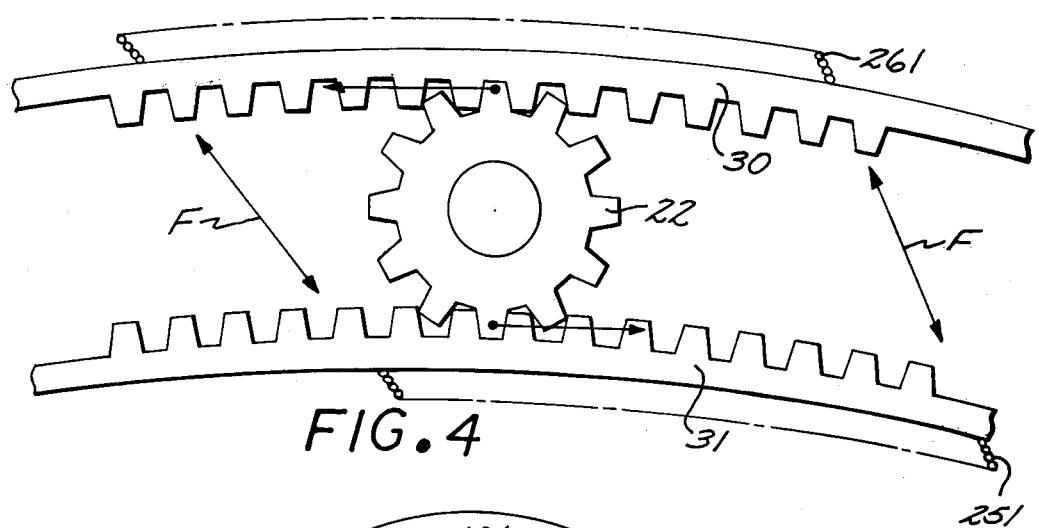
FIG. 4 is an end view of the device shown in FIG. 1 illustrating a convenient arrangement of parts for manual control thereover.
Figure 5:
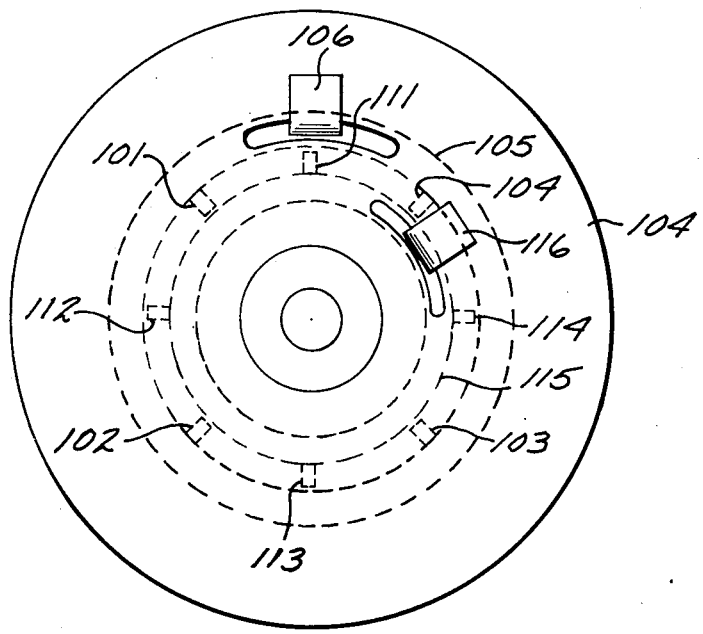
FIG. 5 is a gearing diagram illustrating the operation of the present device.

As shown in FIGS. 1 and 3, ring 51, in turn, is compressed by retaining cap 52 which again, by way of bolts 53, is secured to the edge of shell 27. Attached to the interior of ring 51, between the retaining washer 49 and the cap 52, are a plurality of inwardly directed commutating segments 55 which selectively connect the various windings in the field 26 to four field brushes 101, 102, 103, and 104. In a similar arrangement a plurality of commutation segments 65 are retained around the exterior periphery of an insulating spacer 61, which, in turn, is attached to an insulating washer 62 abutting flange 36. Commutating segments 65, in turn, select for excitation the particular coils in the armature 25 by the selective contact with four armature brushes 111, 112, 113 and 114. Brushes 101-104 are, in turn, mounted on a field brush ring 105 which is mounted for rotation in the end plate 13 along an interior armature brush ring 115 supporting brushes 111-114. As shown in FIG. 4, rings 105 and 115 are provided with handles 106 and 116 for articulation, thus allowing for adjustment in the commutation phasing between the counter-rotating armature and field. In this manner various levels of torque output can be achieved by a simple manual adjustment.

Attached to ring 105 and separated from brushes 101-104 by an increment of arc slightly greater than the arc dimension of one field commutation segment 55 are an additional four pick-up brushes 107-110 which, according to the arrow A, are phased to lag the excitation brushes 101-104 to conduct the collapsing field transient to a power amplifier to be described. In similar arrangement, but phased in the counter-rotating direction of arrow B, ring 115 supports four brushes 117-120 which, in turn, pick up the collapsing field in the armature.

Figure 6:
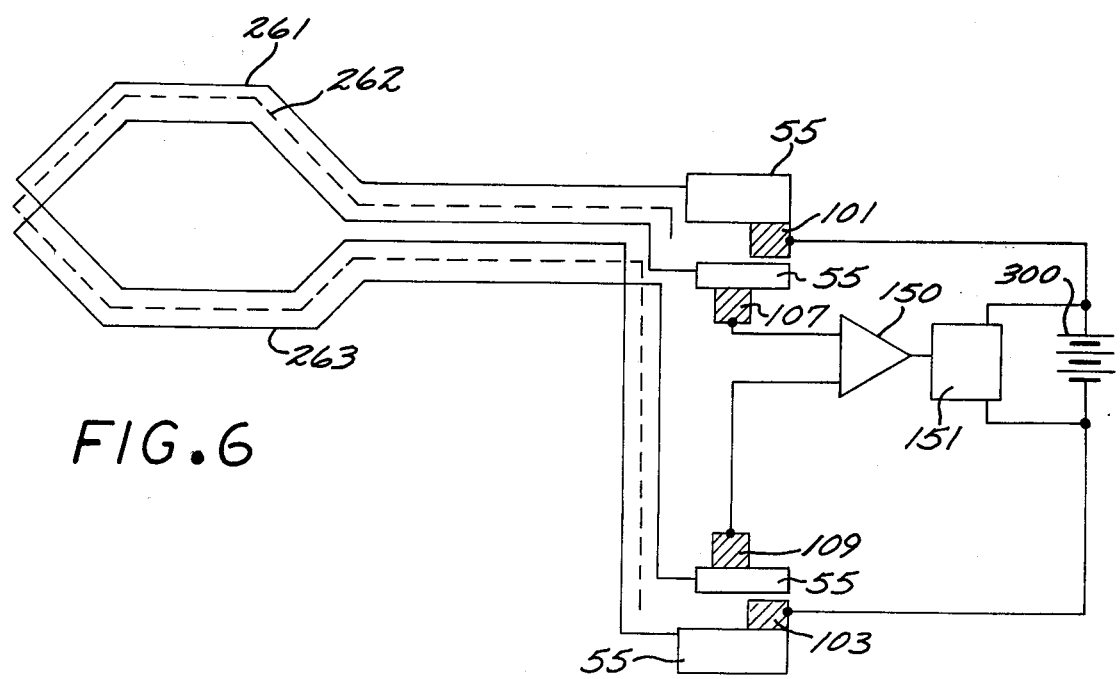
FIG. 6 is a partial schematic illustrating selected coils in the motor disclosed herein.

By reference to FIG. 6, the operation of brushes 101-104 and 107-110 will now be taken up, it being understood that the armature brushes are similarly operative. Shown in this figure, are three adjacent field windings designated as windings 261, 262 and 263. Winding 261 is connected between selected ones of the commutation segments 55 which, in this instance, are contacted by brushes 101 and 103. Brushes 101 and 103, in turn, are connected across a battery 300 which provides the requisite field excitation to drive the motor. Winding 262, shown in dashed line, is not connected to any power source and is therefore starting to undergo the field collapse effect. Winding 263, however, is contacting brushes 107 and 109 which pick up the remainder of the collapse transient to apply such transient to a power amplifier 150, which, through a rectifier 151, returns some of the field collapse power back to battery 300.

This arrangement of brushes both avoids the possibility of common contact of a single commutating segment, and furthermore provides an isolating coil or winding 262 which will mask the power phasing of the field collapse transient from winding 261.

By reference to FIG. 4, the torquing arrangement between ring gear 30 and gear 31 is illustrated. Specifically shown schematically, on the exterior of the ring gear 30 to the winding 269. A similar winding 251 is shown along gear 31 indicating one armature winding. Developed between windings 251 and 261 is a force field F which resolves itself into a tangential couple T around the planetary gear 22. Thus, the armature torque is additive with the moment around gear 22 increasing the total torque output of the motor.

Some of the many advantages of the present invention should now be readily apparent. The invention provides by means convenient in production, an arrangement which both increases the motor torque and which furthermore recovers part of the collapsing field losses to thus increase the effiency of the motor.

Obviously many modifications and variations to the above disclosure can be made without departing from the spirit of the invention. It is therefore intended that the scope of the invention be determined solely dependent on the claims hereto.

I claim:

1. In an electric motor having a field and rotor that each has windings thereof, the improvement comprising:

a. counter-rotating means disposed between said rotor and field for rendering said field rotatable in a direction opposite to the rotation of said rotor;
b. commutation means on said field and rotor, said commutation means including a field commutation ring selectively connecting predetermined ones of said windings for excitation and a rotor commutation ring for exciting predetermined other ones of said windings;
c. a casing supporting in rotation with said field and rotor; and
d. brush means disposed in said casing for providing electrical connection to said commutation means, said brush means including two adjustable rings mounted for rotation on said motor, each ring including a corresponding set of brushes for controlling the relative phase angle between the excitation of said one winding and said other winding according to the relative angular alignment thereof.

2. Apparatus according to claim 1 in which said field commutation ring is connected for concurrent rotation with said field and said rotor commutation ring is connected for concurrent rotation with said rotor.

3. Apparatus according to claim 2 in which said brush means further includes;
a plurality of first excitation brushes mounted in said motor and disposed for contact with said field commutation ring, a plurality of second excitation brushes mounted in said motor and disposed for contact with said rotor commutation ring, a source of electrical excitation connected to said first and second excitation brushes, and a plurality of first and second pick-up brushes disposed in said motor to contact respectively said field and rotor commutation rings in a lagging relationship with said first and second excitation brushes for operatively conducting the collapse transients in field and rotor to said excitation source.

4. Apparatus according to claim 1 wherein:
said counterrotating means includes an inwardly directed ring gear formed along one end of said field, concentrically opposing pinion gear formed on said rotor, and a plurality of planetary gears mounted for rotating in said motor and disposed between said ring and pinion gears.

5. Apparatus according to claim 4 in which said field and rotor commutation rings each include a plurality of segments that are selectively contacted by said field and rotor excitation brushes, and said apparatus further including:
a plurality of field and rotor excitation brushes disposed in said housing for selective contact with ones of said segments in said field and rotor commutation rings;
a source of electrical power connected to said excitation brushes;
a plurality of field and rotor pick-up brushes disposed in said housing for selective contact with other ones of said segments in said field and rotor commutation rings;
a power amplifier connected to said pick-up brushes; and
a rectifier connected to said pick-up brushes disposed in said housing for selective contact with other ones of said segments in said field and rotor commutation rings;
a power amplifier connected to said pick-up brushes; and
a rectifier connected to said power amplifier and to said source of electrical power.

6. Apparatus according to claim 5 wherein:
said pick-up brushes are disposed to lag in rotation said excitation brushes.

7. Apparatus according to claim 6 wherein:
said lag between said pick-up and excitation brushes is substantially equal to the arc dimension of said segments.

8. Apparatus according to claim 5 in which said source of electric power is rechargeable battery means.

* * * * *